(12) United States Patent
Duarte et al.

(10) Patent No.: US 7,262,761 B1
(45) Date of Patent: Aug. 28, 2007

(54) USER INTERFACE FOR DETECTING A DATA ENTRY MODE

(75) Inventors: Matias Duarte, San Francisco, CA (US); Justin V. Lee, Berkeley, CA (US)

(73) Assignee: Danger, Inc., Palo Alto, CA (US)

( * ) Notice: Subject to any disclaimer, the term of this patent is extended or adjusted under 35 U.S.C. 154(b) by 734 days.

(21) Appl. No.: 10/829,588

(22) Filed: Apr. 21, 2004

(51) Int. Cl.
*G09G 5/00* (2006.01)
(52) U.S. Cl. ................ 345/168; 379/93.23; 341/22
(58) Field of Classification Search ........ 345/168–169; 455/556.1, 556.2, 186.2; 379/93.27, 433.04; 715/810, 864
See application file for complete search history.

(56) References Cited

U.S. PATENT DOCUMENTS 7,231,229 B1 * 6/2007 Hawkins et al. ............ 455/564

* cited by examiner

*Primary Examiner*—Richard Hjerpe
*Assistant Examiner*—Abbas I. Abdulselam
(74) *Attorney, Agent, or Firm*—Blakely, Sokoloff, Taylor & Zafman LLP

(57) ABSTRACT

A method is described comprising: assigning to each of a first group of keys of an alphanumeric keyboard a specific alphabetic character; assigning to each of a second group of keys of the alphanumeric keyboard both a specific alphabetic character and a specific number; and monitoring keys on the keyboard selected in sequence by an end user, and if all keys within the sequence are keys within the second group of keys, generating within the display a contact list containing contact entries, each of the contact entries within the list identified based on the alphabetic characters associated with the sequence of selected keys and/or the numbers associated with the sequence of selected keys.

24 Claims, 11 Drawing Sheets

USER INTERFACE FOR DETECTING A DATA ENTRY MODE

BACKGROUND OF THE INVENTION

1. Field of the Invention

This invention relates generally to the field of data processing devices. More particularly, the invention relates to a versatile user interface for identifying and selecting a telephone number on a data processing device by analyzing user input.

2. Description of the Related Art

Portable data processing devices such as Personal Digital Assistants ("PDAs") and programmable wireless telephones are becoming more powerful every day, providing users with a wide range of applications previously only available on personal computers. At the same time, due to advances in silicon processing technology and battery technology, these devices are manufactured using smaller and smaller form factors. Accordingly, users no longer need to sacrifice processing power for portability when selecting a personal data processing device.

Although data processing devices with small form factors tend to be more portable, users may find it increasingly difficult to interact with them. For example, entering data may be difficult due to the absence of a full-sized keyboard and reading information may be difficult due to a small, potentially dim Liquid Crystal Display ("LCD").

To conserve the space required for data input, data entry keys such as those used on miniature alphanumeric keyboards are typically assigned multiple functions. For example, when the data processing device is in a "data entry" mode, the keyboard may function as a standard alphanumeric keyboard but when the device is in a "telephony mode" (e.g., when the user opens dials a telephone number), portions of the keyboard may be used as a telephony keypad. For example, when in telephony mode (or other type of numeric entry mode), the characters 'Y,' 'U' and 'I' may change to the numbers '1,' '2,' and '3,' respectively; the characters 'H,' 'J' and 'K' may change to the numbers '4,' '5,' and '6,' respectively; and so on.

Although current data processing devices provide multiple data entry modes, they are not capable of automatically detecting which mode a user needs. Accordingly, users must manually switch between modes before performing a particular type of data entry. Thus, what is needed is an improved user interface for a data processing device which automatically switches between data entry modes based on the detected data entry pattern of a user.

SUMMARY

A method is described comprising: assigning to each of a first group of keys of an alphanumeric keyboard a specific alphabetic character; assigning to each of a second group of keys of the alphanumeric keyboard both a specific alphabetic character and a specific number; and monitoring keys on the keyboard selected in sequence by an end user, and if all keys within the sequence are keys within the second group of keys, generating within the display a contact list containing contact entries, each of the contact entries within the list identified based on the alphabetic characters associated with the sequence of selected keys and/or the numbers associated with the sequence of selected keys.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Several different multi-purpose input/output and display configurations for a data processing device are described below. As will be apparent from the following description, many of these configurations are particularly beneficial when employed on a dual-purpose data processing device such as a personal digital assistant ("PDA") or other mobile computing device having integrated wireless telephony capabilities (e.g., a combination PDA and cell phone). However, it should be noted that the underlying principles of the invention are not limited to wireless telephony configuration.

An Exemplary Data Processing Device

Figure 1:
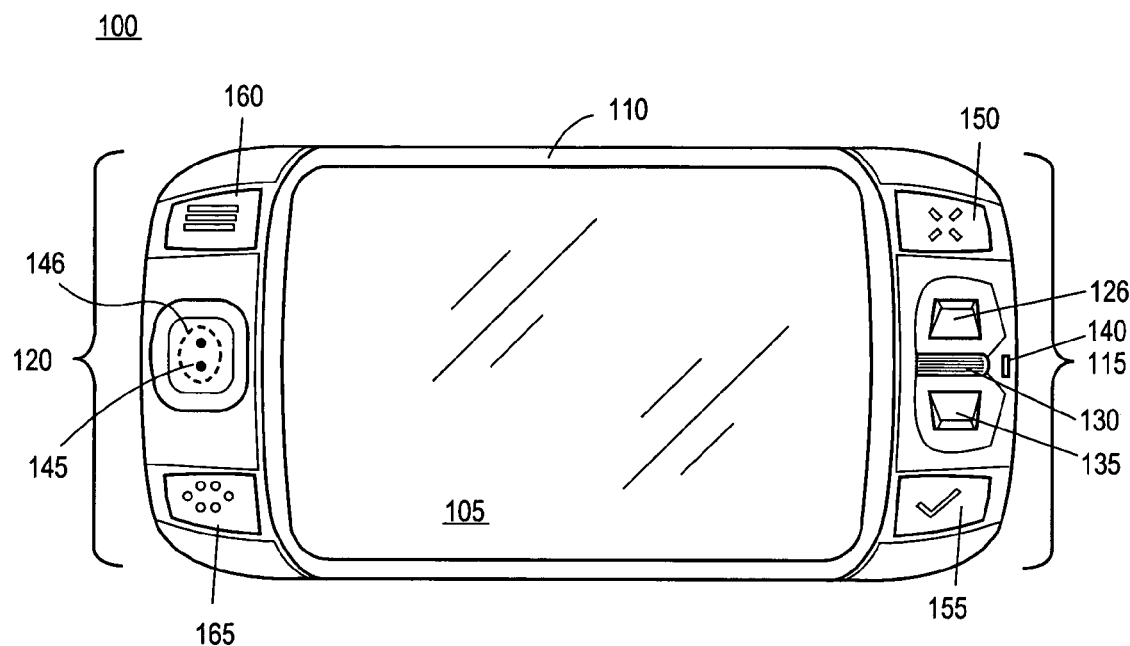
FIG. 1 illustrates an exemplary data processing device on which embodiments of the invention are employed.
Figure 2A:
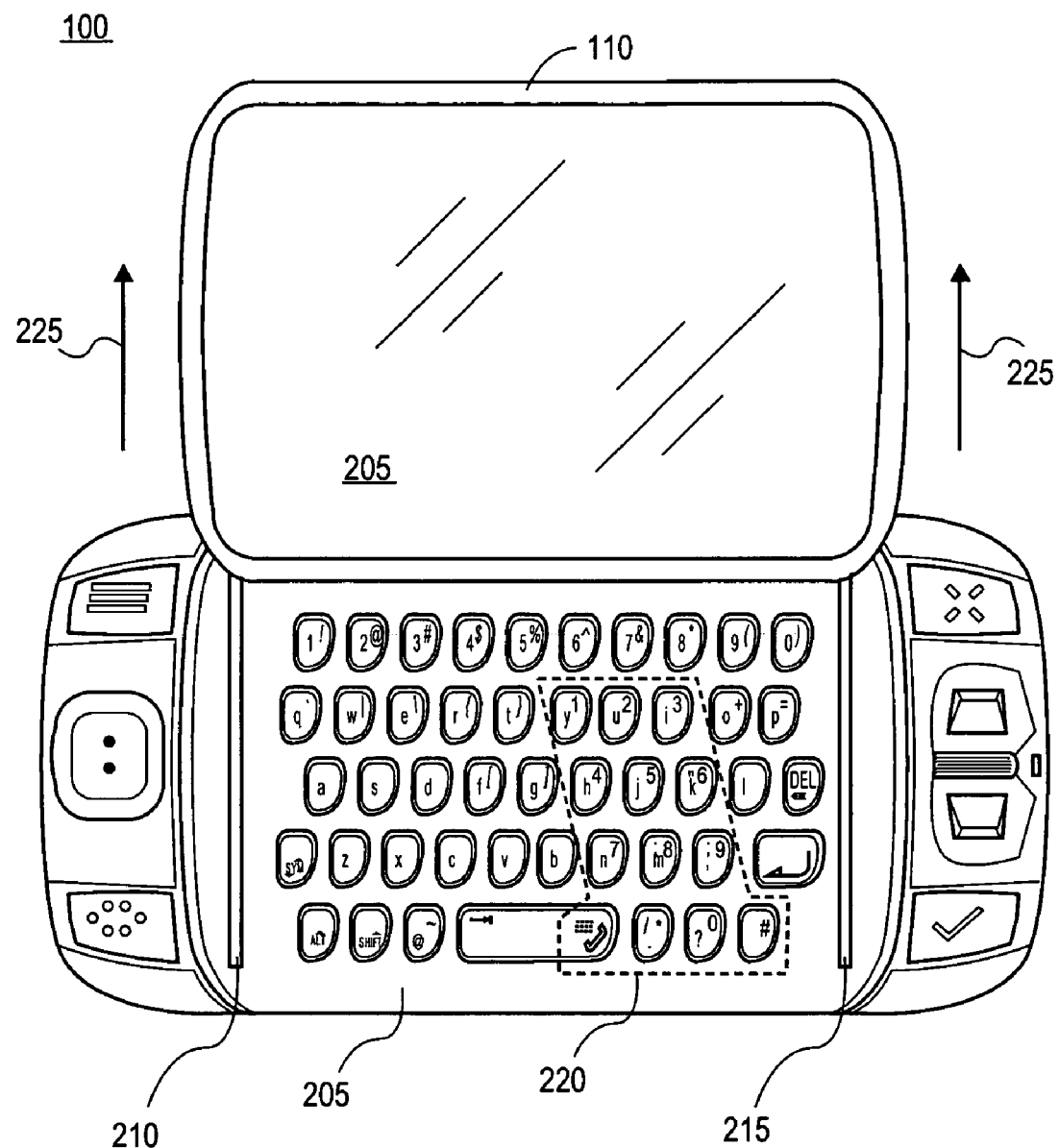
FIGS. 2a-b illustrate two mechanisms for exposing an alphanumeric keyboard on a data processing device.
Figure 2B:
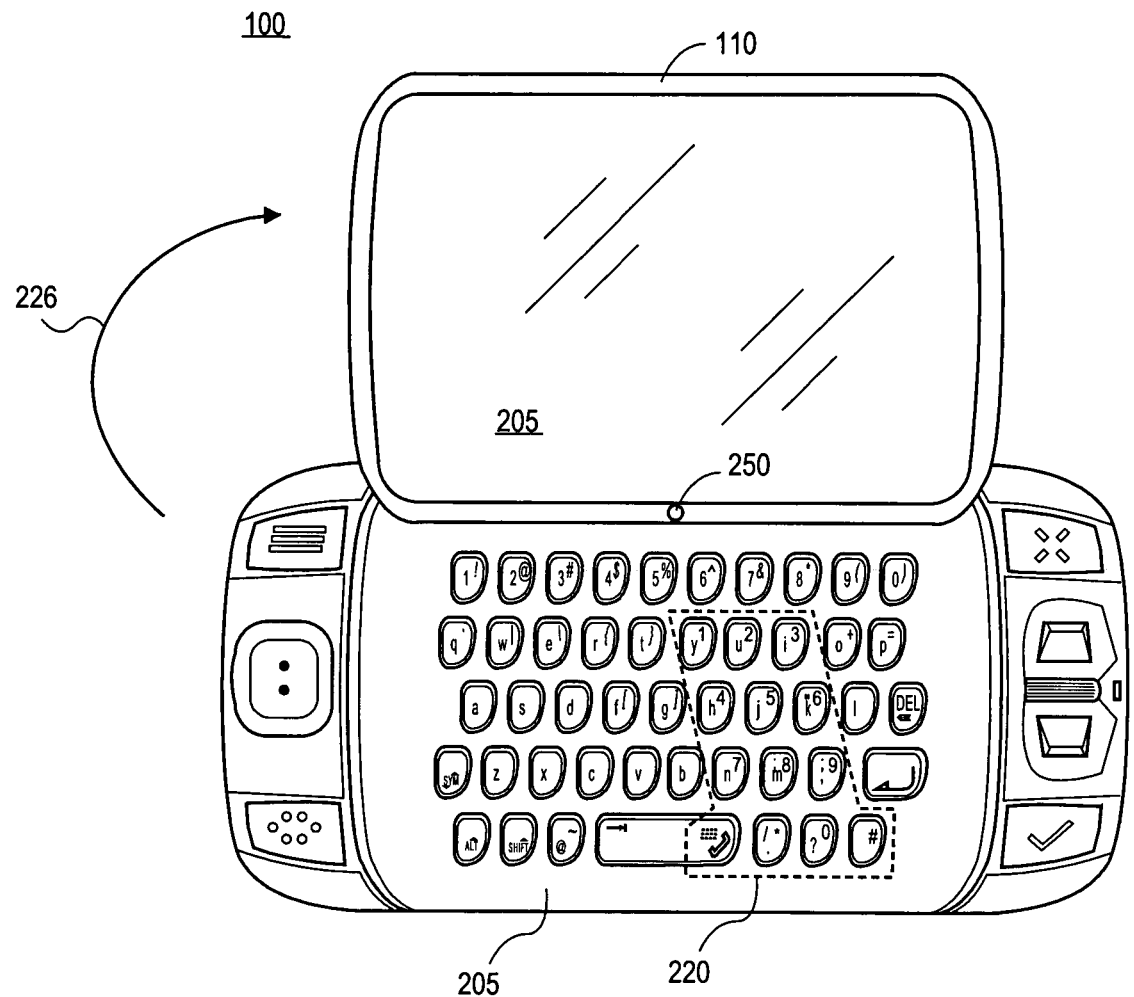

A data processing device 100 according to one embodiment of the invention is illustrated in FIG. 1 and FIGS. 2a-b. The data processing device 100 includes a display 110 with a viewable display area 105 for displaying various types of text and graphics (e.g., graphical navigation menus, email messages, electronic calendars, electronic address books, . . . etc). In one embodiment, the display is a backlit or reflective thin film transistor ("TFT") display. In another embodiment, the display is a transflective SuperTwisted Nematican ("STN") display. However, the underlying principles of the invention are not limited to a particular display type.

In one embodiment, the data processing device 100 includes two or more different modes of operation which may be associated with two or more display orientations. In the first mode of operation, the display is viewed in a first position, illustrated generally in FIG. 1 in which it covers an alphanumeric keyboard 205 (illustrated in FIGS. 2*a-b*). In this first position, the display is located flush within the boundary defined by the non-display portions of the data processing device 100.

By contrast, the display is illustrated in a second position in FIGS. 2*a-b*, in which the alphanumeric keyboard 205 is exposed and usable for data entry. In one embodiment, the second position of the display corresponds to a second mode of operation. As shown in FIG. 2*a*, in one embodiment, the display slides from the first position to the second position in a direction substantially parallel to a plane defined by the front surface of the data processing device 100, as indicated by motion arrows 225. The sliding motion may be accomplished via pins or posts (not shown) on the backside of the display 110 that are engaged with tracks 210, 215 located on the face of the data processing device 100 to the left and right of the alphanumeric keyboard 205, respectively. In one embodiment, the display lifts upward, forming an angle in relation to the data processing device (e.g., either prior to sliding to the second position and/or after it has reached the second position).

By contrast, in the embodiment illustrated in FIG. 2*b*, the display rotates around a pivot point 250 the first position to the second position, as indicated by rotation arrow 226. In one embodiment, the display remains substantially parallel with the plane of the keyboard as it moves. Alternatively, in one embodiment, the display initially lifts upward, forming an angle between itself and the plane of the keyboard before or after rotating from the first position to the second position. The underlying principles of the invention are not limited to any particular mechanism for exposing the keyboard 205.

In one embodiment, the data processing device 100 includes a first set of control elements 115 positioned to the right of the display 110 and a second set of control elements 120 positioned to the left of the display. The first set of control elements 115 may include a control wheel 130 positioned between two control buttons 126, 135, as illustrated. As in prior embodiments of the invention, the control wheel 130 may be used to move a cursor control device, highlight bar or other selection graphic on the display to select menu items, program icons and/or other graphical or textual display elements. In one embodiment, the control wheel 130 is made of clear plastic with an light emitting diode ("LED") or other light source embedded therein (e.g., to illuminate during incoming telephone calls or instant messages).

In one embodiment, the first control button 126, located above the control wheel 130, is a "page up" button for generating "page up" control functions. For example, when a word processing document, Web page, email message or other type of document is displayed in the foreground of the display 110, selection of the first control button 126 will jump upward through the displayed data/images by a full display screen's worth of data/images. When navigating through menus, selection of the first control button 126 may cause a selection element to jump multiple menu items or other graphical elements. Various different/additional "page up" functions may be trigged via the first control button 126 while still complying with the underlying principles of the invention. The second control button 135, located below the control wheel 130, is a "page down" button for generating "page down" control functions (e.g., which operate in the same manner as the "page up" control functions but in the opposite direction).

In one embodiment, a series of additional control elements 150, 155, 160, and 170 are configured on the data processing device 100 to provide various additional preprogrammed and/or user-specified control functions. For example, a control element 150 may be a designated "home" key for jumping to the data processing device's main menu, or performing application-specific functions typically associated with a "home" key (e.g., moving a cursor to the beginning of a line in a word processing document). Control element 155 may be a dedicated a "menu" key which generates a context-specific menu when selected (e.g., a different menu may be generated based on which application is currently running). Control keys 160 and 165 may be designated "jump" keys, allowing the user to easily jump to (i.e., execute) a designated application program. The control elements 150, 155, 160 and 165 may be programmed for various alternate and/or additional functions while still complying with the underlying principles of the invention.

In one embodiment, the second set of control elements includes a directional pad 145 having an integrated speaker 146 and/or LED (not shown) (or other light source). In one embodiment, the directional pad 145 is designed in substantially the same manner as the directional pad described in the co-pending application entitled DIRECTIONAL PAD HAVING INTEGRATED SPEAKER AND LIGHT SOURCE, Ser. No. 10/718,749, Filed Nov. 21, 2003, which is assigned to the assignee of the present application.

The directional pad 145 may be used to move a cursor or other selection graphic in any direction on the display to enable selection of menu items, program icons and other graphical or textual display elements. The directional pad 145 may be made of frosted translucent plastic and may be white in color, although other materials and colors may be used. The LED contained in the directional pad may be a tri-color LED that generates a variety of colors to alert the user when an incoming message has been received. In "telephony mode" (described below), the speaker 146 contained in the directional pad 145 enables the user to hear the party on the other end of a call. In addition, a microphone 140 is configured at the end of the data processing device 100 opposite the speaker 146 so that the data processing device 100 may be held like a mobile phone while in telephony mode (i.e., when the speaker placed next to the user's ear, the microphone is located in the proximity of the user's mouth).

In one embodiment, when in "telephony mode" the functions performed by the various control elements 115, 120 and/or keys on the keypad 205 change to designated telephony functions. For example, in the telephony mode of operation, the control button 126 above the scroll wheel may function as a "call" button with which the user may initiate a telephone call once the number to be called has been entered. The control button 125 below the scroll wheel 130 may function as a "hang up" button, with which the user may conclude a telephone call.

Referring to FIGS. 2*a-b*, to simplify numeric data entry when in telephony mode, a designated set of alphanumeric keys 220 from the keyboard 205 may change to a numeric keypad (e.g., the 'y' key may change to a '1' key, the 'u' key may change to a '2' key, . . . etc).

In addition, the glyphs on the control elements 115, 120 and/or keys on the keypad 205 may change to reflect the change in operation in the same or a similar manner as described in the embodiments above. For example, light emitted by LEDs embedded within the control buttons 125 and 126 on either side of the scroll wheel 130 may be modified to reflect the change in operation in telephony mode. In one embodiment, for example, the "call" and "hang up" glyphs are highlighted on the control buttons 125 and 126, in contrast to "page up" and "page down" glyphs, respectively.

In one embodiment, two-color LEDs are employed within the keys of the alphanumeric keyboard 205. When the data processing device is not in telephony mode, both colors of the two-color LEDs are illuminated under all of the alphanumeric keys 205, thereby highlighting the standard set of alphanumeric glyphs on the keys. For example, if the two-color LEDs are red and green, the combination will generate an amber color beneath the alphanumeric keys 205. By contrast, when in telephony mode, only one color of each of the two-color LEDs is illuminated. Moreover, in one embodiment, the one LED is illuminated only beneath each of the designated set of numeric keypad keys 220 (as opposed to illuminating the one LED beneath each of the entire alphanumeric keyboard 205). By way of example, if only the green LEDs are illuminated beneath each of the designated set of keys 220, then the numeric keypad glyphs (i.e., numbered 1-9) will be illuminated with a green color in contrast to the standard alphanumeric glyphs. Various different techniques may be employed to illuminate the numeric keypad glyphs and/or the standard alphanumeric glyphs.

Embodiments of a User Interface for Detecting a Data Entry Mode

Figure 3A:
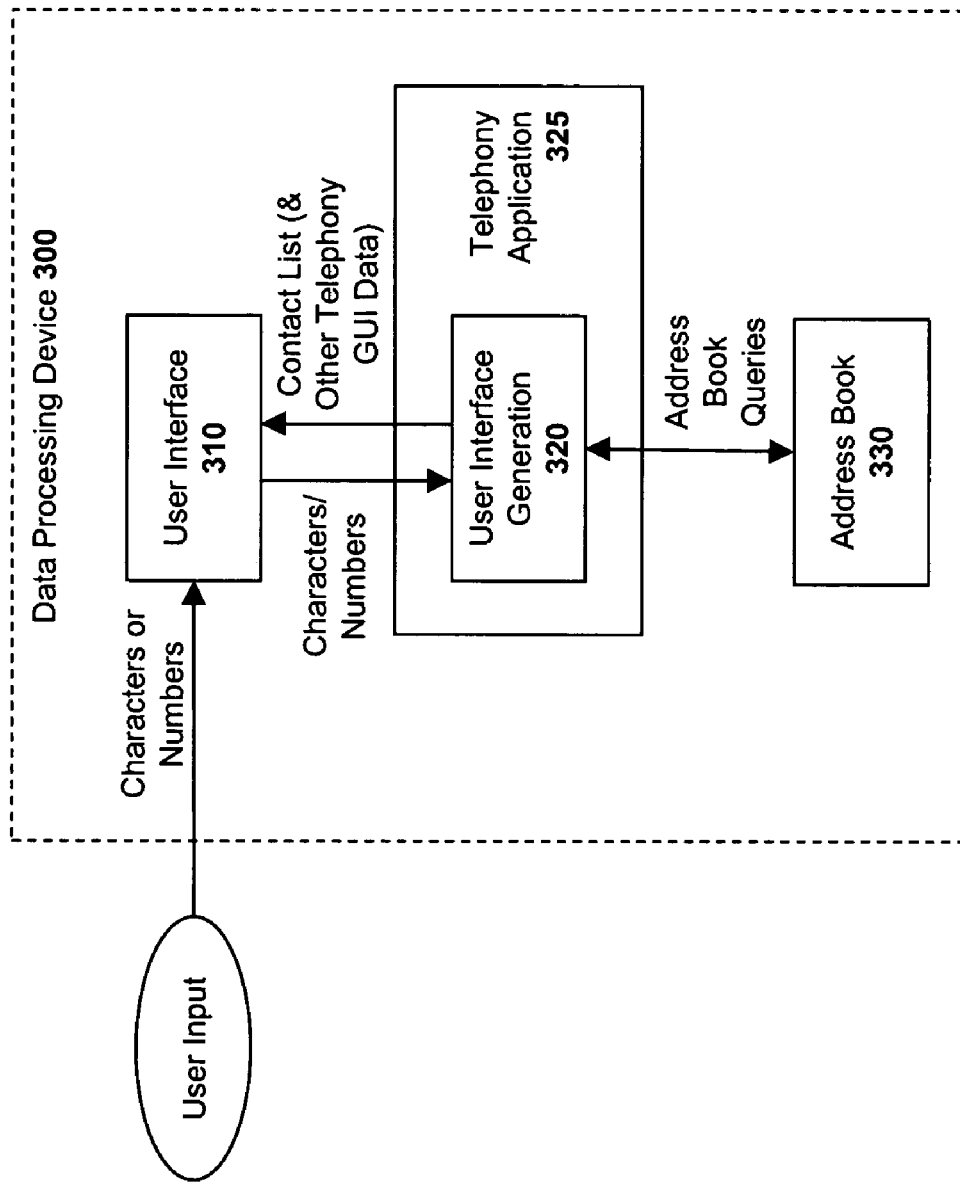
FIG. 3a illustrates an architecture employed in one embodiment of the invention.

As mentioned above, one embodiment of the data processing device 100 automatically detects the data entry mode desired by the user based on the sequence of characters (i.e., text and/or numbers) selected by the user. As illustrated in FIG. 3*a*, this embodiment employs a telephony application 325 for sending and receiving telephone calls. The telephony application 325 includes user interface generation logic 320 for automatically identifying a data entry mode and generating a graphical user interface based on the series characters entered by the user. As described in greater detail below, the user interface generation logic 330 may query the user's address book 330 to update the contents of the user interface 310 (e.g., the displayed contact list) each time the user enters a new character.

Figure 4A:
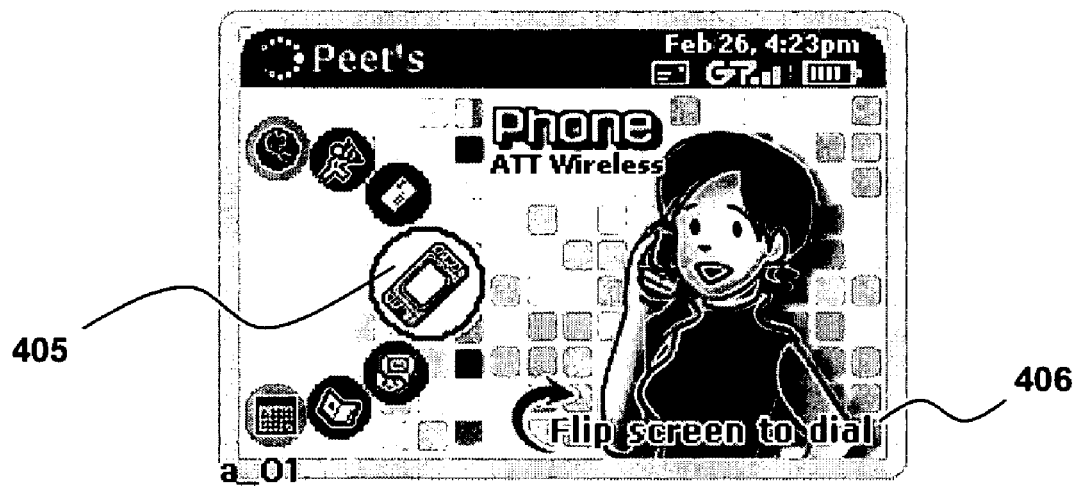
FIGS. 4a-b illustrate embodiments of a graphical menu navigation window.
Figure 4B:

FIGS. 4*a* and 4*b* illustrate a main menu provided to the end user, with a graphical icon 405 associated with the telephony application highlighted. The user interface shown in FIG. 4*a* is generated when the alphanumeric keyboard 205 is covered by the display 110, whereas the user interface shown in FIG. 4*b* is generated when the alphanumeric keyboard 205 is exposed. As indicated, when the keyboard is covered, text/graphics 406 are provided instructing the user to "flip the screen to dial." Alternatively, if the keyboard is already exposed, text/graphics 410 are provided informing the user that he/she may begin typing to select a telephone number.

Figure 5A:
FIGS. 5a-b illustrate embodiments of an opening screen for a telephony application.
Figure 5B:
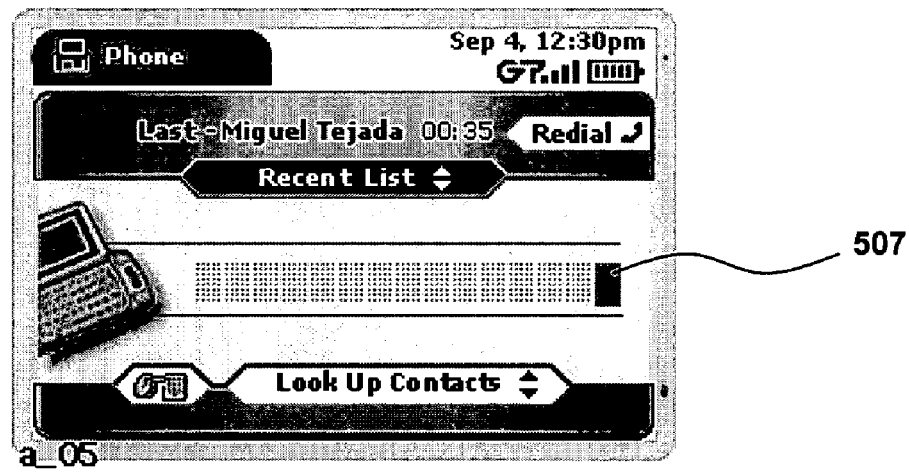

FIGS. 5*a* and 5*b* illustrate different opening screens for the telephony application based on whether the keyboard 205 is covered or exposed, respectively. In FIG. 5*a*, with the keyboard covered, the user is provided with option to generate a recent calls list 505 containing a list of the last N calls made by the user (e.g., listed in chronological order). The recent calls list 505 may be selected via manipulation of the scroll wheel 130, either alone or in combination with other user input elements (e.g., such as the directional pad 145).

In addition, in FIG. 5*a*, the user is provided with the option to "look up contacts" 506 from the address book 330. Upon selection, a list of address book entries may be displayed alphabetically. The user may then navigate through the entries via the scroll wheel 130 (or other user interface element).

In addition, as illustrated in FIG. 5*b*, when the alphanumeric keyboard 105 is exposed, the user is provided with a data entry field 507 in which to enter a new telephone number or contact name.

Figure 3B:
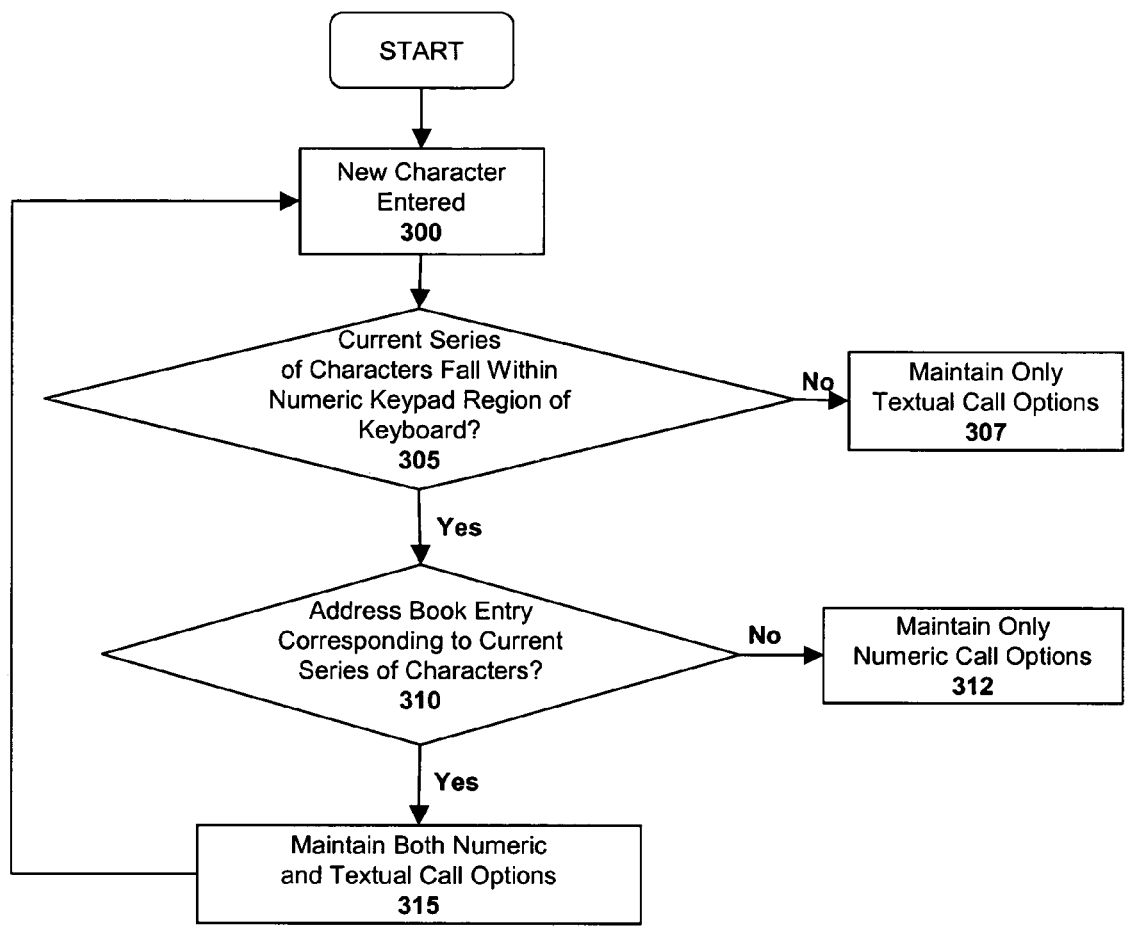
FIG. 3b illustrates a process implemented to detect a data entry mode according to one embodiment of the invention.

In one embodiment, as soon as the user begins entering characters via the alphanumeric keyboard 1705, the user interface generation logic 320 operates according to the flowchart of FIG. 3*b*. Thus, when a new character is entered at 300, the user interface generation logic 320 determines whether the current series of characters (i.e., the new character in addition to any previously-entered characters) fall exclusively within the numeric keypad region 220 of the alphanumeric keyboard 205 (see FIGS. 2*a*-*b*). If one or more keys are selected outside of the numeric keypad region 220 are selected, then it can be assumed that the user is attempting to enter a contact name rather than a phone number. Accordingly, at 307, the user interface generation logic 320 enters a text-only mode, causing the keys within the numeric keypad region 220 to generate their associated alphabetic characters when selected, rather than their associated numbers (e.g., selection of key 'y$^1$' will cause a 'y' to be selected rather than a '1'). In this embodiment, the interface generation logic 320 may generate a contact list based solely on the entered alphabetic characters (i.e., rather than using both alphabetic characters and numbers as described below).

Figure 6A:
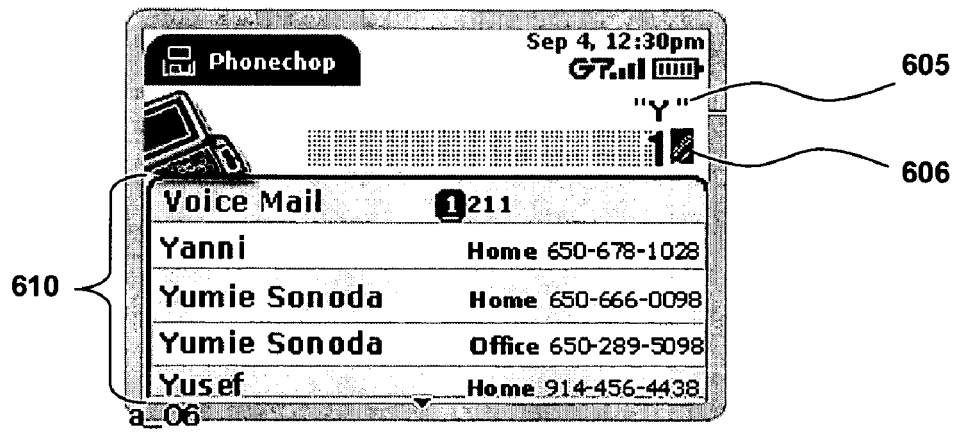
FIGS. 6a-c illustrate one embodiment of a user interface for presenting a contact list based on user input.
Figure 6B:
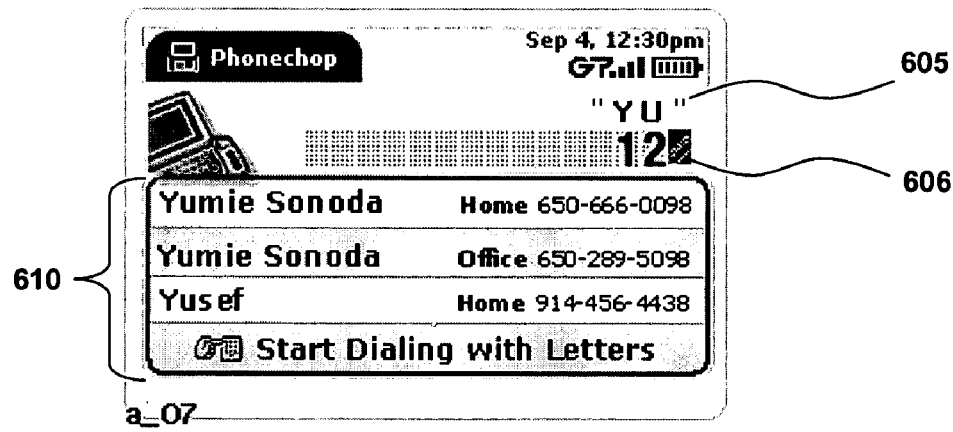
Figure 6C:
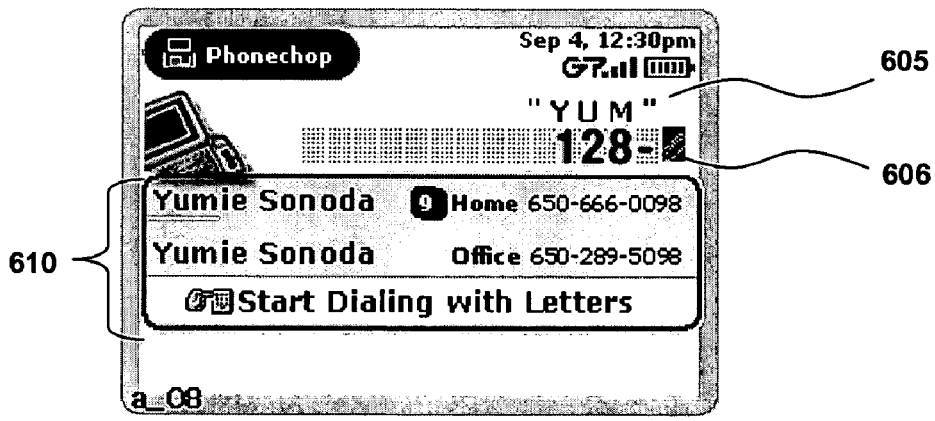

If the current series of characters are all within the numeric keypad region 220, then at 310 a determination is made as to whether an address book entry exists which corresponds to the entered characters. If so, then at 315, the user interface generation logic 320 generates a user interface 310 which contains both numeric and textual call options. One embodiment of the user interface 310 is illustrated in FIGS. 6*a*-*c* which includes a list of contacts 610 corresponding to the entered characters. In addition, two data entry fields are provided: a first field 605 which indicates the alphabetic characters entered by the user and a second field 606 indicating the numbers entered by the user.

In FIG. 6*a*, the user has selected the 'y$^1$' key. In response, the user interface generation logic 320 generates a 'y' in the first field 605, a '1' in the second field 606, and generates a potential list 610 of contact options. The list 610 includes contacts starting with 'y' and also includes a speed dial option associated with the number '1' (i.e., the speed dial option for voicemail, as indicated in FIG. 6*a*). Speed dial allows a number to be dialed simply by selecting and holding a specified key for a short period of time.

In FIG. 6*b*, the user has selected a second key, 'u$^2$,' from within the numeric keypad region 220. As such, the user interface generation logic 320 continues to provide the user with both numeric and textual call options. The new number '2' is displayed within the first data entry field 605 and the new letter 'u' is displayed within the second entry field 606. In addition, the user interface generation logic has narrowed the list 610 of contacts to only those contacts starting with the letters 'YU.'

In FIG. 6*c*, the user has selected a third key, 'm$^8$,' from within the numeric keypad region 220. As such, the new number '8' is displayed within the first data entry field 605 and the new letter 'm' is displayed within the second entry field 606. Similarly, only those contact entries starting with 'YUM' are displayed within the contacts list.

In one embodiment, contacts with phone numbers that correspond to the numbers entered by the user are also displayed within the contacts list 610 (i.e., in addition to contacts with names corresponding to the letters entered by the user). For example, if a contact with a phone number starting with '12' existed in the user's address book, then the user interface generation logic 320 would generate an entry in the contact list for this contact in FIG. 6b. Contacts with corresponding numbers may be listed either relatively higher or lower on the list than contacts with corresponding letters, depending on the desired configuration.

Moreover, in one embodiment, the letters and/or numbers corresponding to the letters/numbers entered by the user are highlighted within the contact list. For example, in FIG. 6b the letters 'YU' may be underlined within the contact list. Similarly, If a contact having a phone number starting with the numbers '12' were included within the same list, the numbers '12' may be underlined for those entries, thereby highlighting the reason why the entries have been selected.

In addition, in one embodiment, the contacts list 610 may not merely be ordered alphabetically. Rather, in one embodiment, the list is ordered based on other variables such as call frequency. For example, if the user calls a particular contact more frequently than other contacts, then that particular contact will be placed relatively higher on the contact list in relation to the other contacts. For example, in FIG. 6a, "Yusef" may be placed at the top of the list 610 if previous calls have been made to "Yusef" more than any other contact on the list (e.g., more than "Yanni" and "Yumie"). Various other techniques may be employed to order the contact list 610 while still complying with the underlying principles of the invention.

Figure 8A:
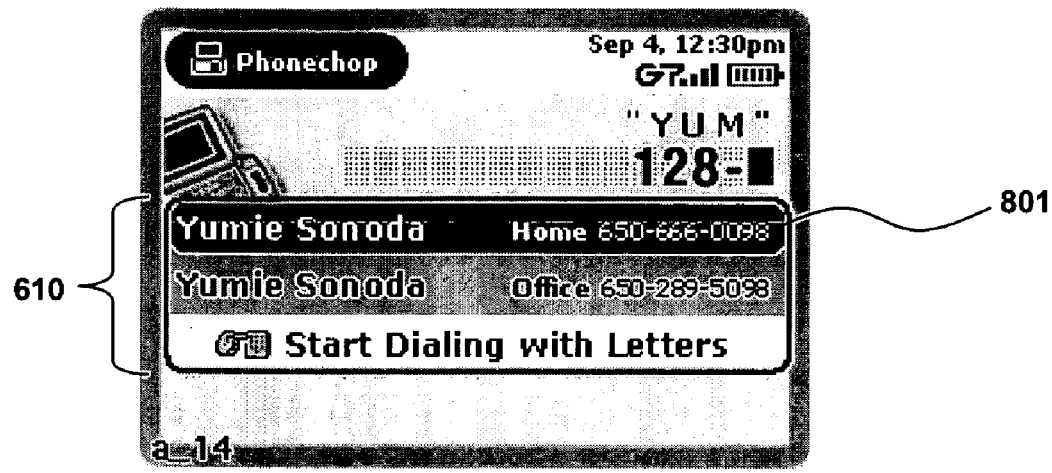
FIGS. 8a-b illustrate one embodiment of a user interface for selecting a contact from within a contact list.
Figure 8B:
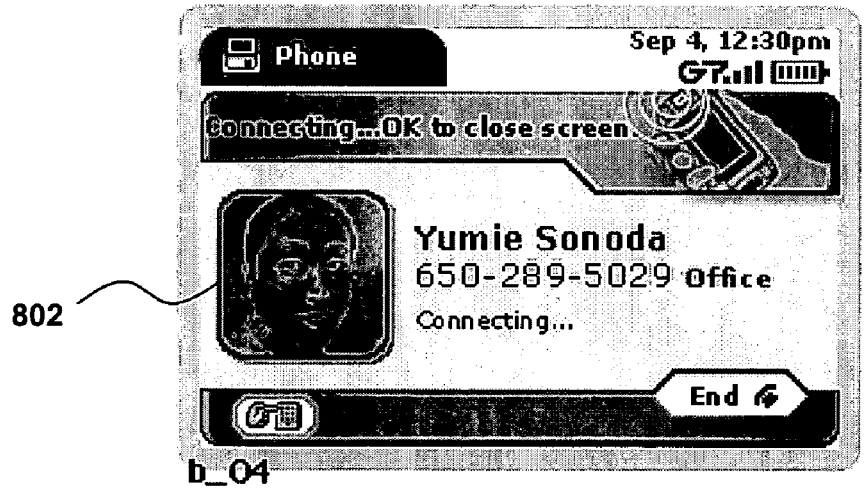

In one embodiment, any time a contact list 610 is generated, the user may scroll down to highlight a particular entry from the contact list to initiate a call. For example, in FIG. 8a, the user has scrolled down to highlight the entry 801 for "Yumie Sonoda." In one embodiment, when the user selects this entry and initiates a call, a screen such as that illustrated in FIG. 8b is generated, containing a picture 802 of the contact (if one exists). Other data associated with the contact may also be displayed such as an audio track of the contact.

In one embodiment, scrolling to an entry within the contact list 610 is accomplished by turning the control wheel 130 until the correct contact is highlighted and then depressing the control wheel to select the contact. Of course, various other user input functions may be employed to select an entry from the contact list while still complying with the underlying principles of the invention.

As mentioned above, in one embodiment, the user interface generation logic 320 performs a query to the address book database stored on the data processing device to generate the contact list (e.g., using the characters 'Y,' 'YU,' and then 'YUM' in the previous example). It should be noted, however, that a strict database "query" is not required for complying with the underlying principles of the invention. For example, the address book data may be stored in a single spreadsheet or other standard file type. The user interface generation logic 320 may then scan the file to identify the appropriate entries.

Figure 7A:
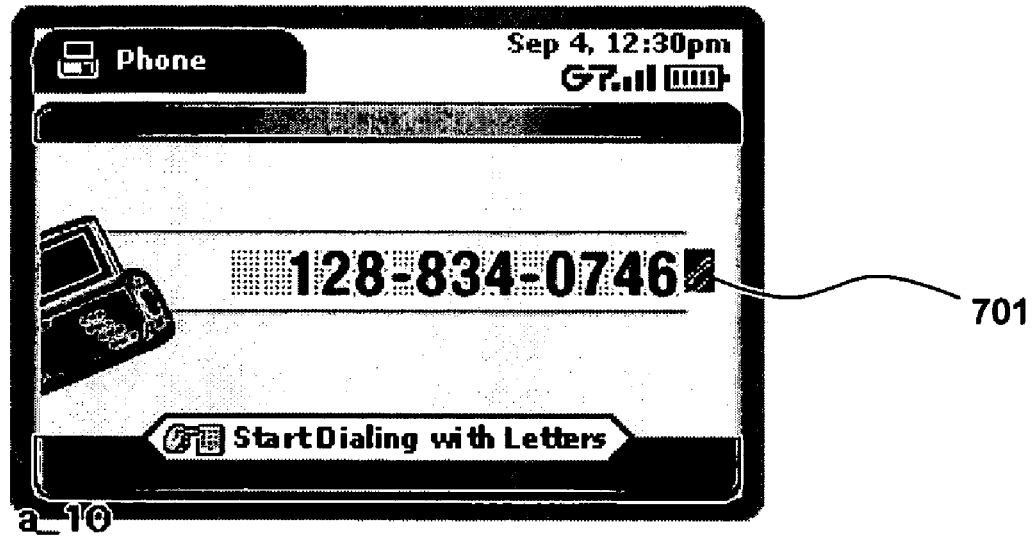
FIGS. 7a-b illustrate one embodiment of a user interface for manually entering a telephone number.
Figure 7B:
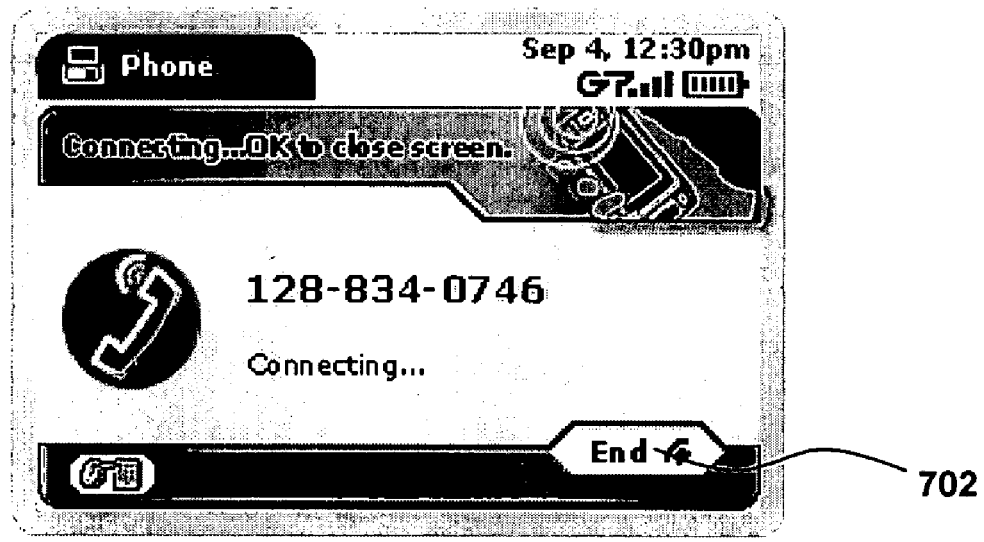

Returning to FIG. 3b, if it is determined at 310 that no address book entries exist which correspond to the entered series of numbers and/or letters, then the user interface generation logic will switch to a manual call entry mode in which only the numbers corresponding to the numeric keypad region are displayed. For example, in FIG. 7a, the user has entered the numeric sequence '128-834-0746' which does not correspond to any entry in the user's address book. As such, only a single numeric data entry field 701 is displayed in the center of the screen along with the entered number. FIG. 7b illustrates one embodiment of screen which is displayed when the user chooses call the entered number. The called number is displayed in the center of the screen and an "end" graphic 702 is provided to end the call upon selection by the end user.

In one embodiment, if the series of key entries entered by the user includes keys outside of the keypad region 220 (i.e., text-only keys), but no corresponding address book entry exists, then an error message will be displayed to the user and the user will be prompted to convert the keyboard to the standard ITU recognized format.

In addition, at any stage of data entry, if the user selects the delete key from the keyboard, the most recent entered character/number will be removed and the user interface will revert to its previous state (i.e., the state it was in prior to the entry of the last character/number).

As described above, the user interface generation logic 320 may automatically remove irrelevant information from the graphical user interface when a user enters a name or telephone number (e.g., displaying only numbers if no contact entries exist). In addition, one embodiment of the telephony application 325 will automatically select and dial the best match any time the user selects the scroll wheel or send key (or other key indicating that a call is desired). For example, the telephony application 325 may automatically change its focus from possible numeric dialable strings to listings in the address book contact list when any characters are dialed from outside of the keypad region 220. Even if only a few characters are entered, the telephony application 325 will automatically select and dial the entry that corresponds to those characters when the scroll wheel or send key are entered. If multiple entries exist, then the telephony application may select the most logical choice. For example, it may select the entry called more frequently by the user or may simply choose alphabetically.

One embodiment of the telephony application 325, when displaying data solely from the numeric keypad area 220, recognizes and gives dial selection preference to the most generic numeric option displayed (i.e., rather than the character-based options). For example, when in the state shown in FIG. 6c, if the user clicks the wheel or uses the "send" key, the "128" string is dialed by the phone, rather than "YUM" or the ITU conversion. In this embodiment, the telephony application 325 will always prefer the generic numeric string before the contact listings, until the numeric string is eliminated (e.g., via dialing textual characters only).

Figure 9:
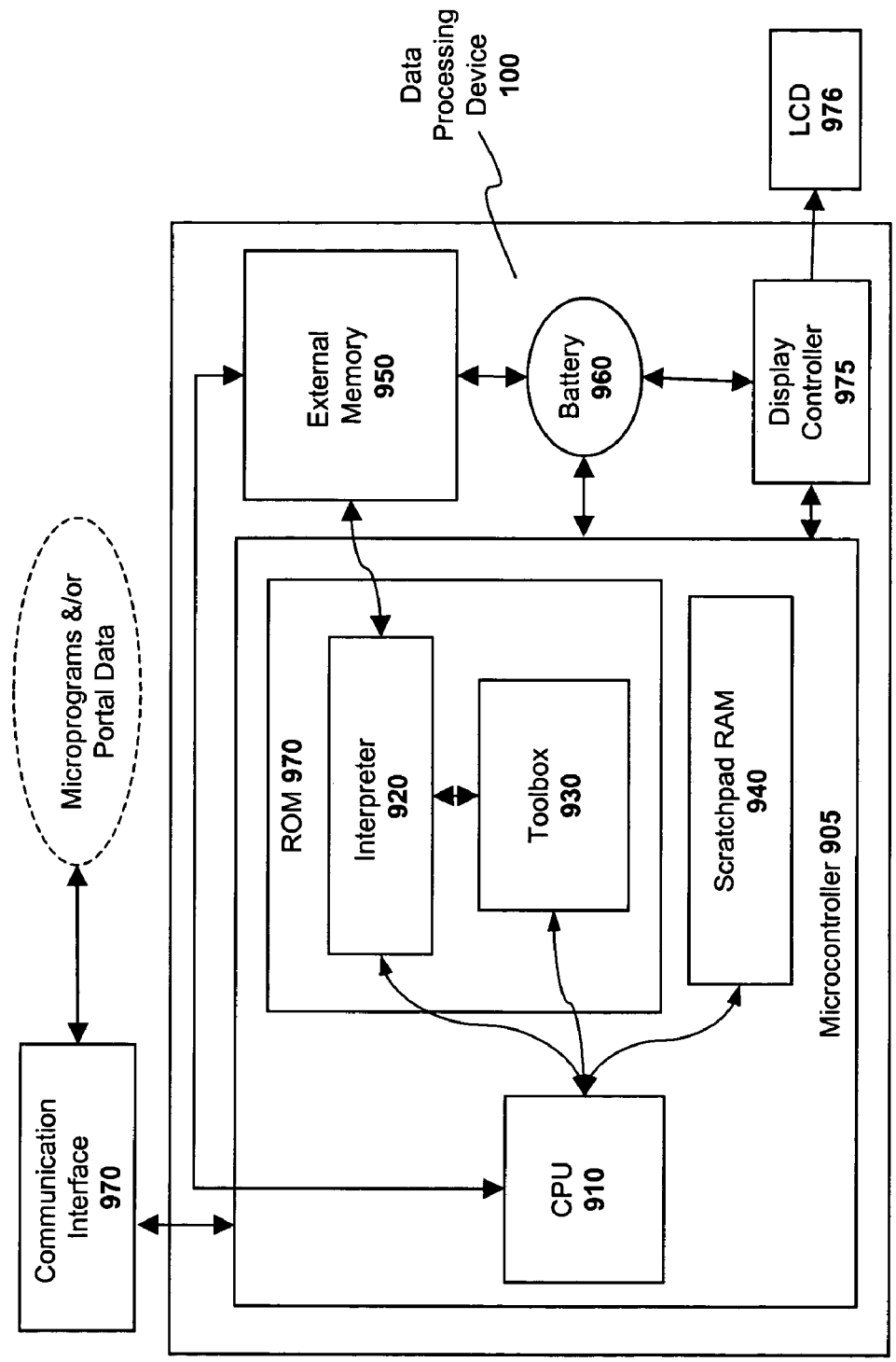
FIG. 9 illustrates a hardware and/or firmware architecture employed in one embodiment of the invention.

One embodiment of a data processing device architecture is illustrated in FIG. 9. It should be noted, however, that the underlying principles of the invention are not limited to any particular hardware or software architecture. In fact, the underlying principles of the invention may be implemented on virtually any data processing device capable of processing data and displaying text and graphics.

The particular embodiment illustrated in FIG. 9 is comprised of a microcontroller 905, an external memory 950, a display controller 975, and a battery 960. The external memory 950 may be used to store programs and/or data 965 transmitted to the data processing device 100 over a network (not shown). In one embodiment, the external memory 950 is non-volatile memory (e.g., an electrically erasable programmable read only memory ("EEPROM"); a programmable read only memory ("PROM"), . . . etc). Alternatively, the memory 950 may be a volatile memory (e.g., random access memory or "RAM") but the data stored therein may be continually maintained via the battery 960. The battery 960 in one embodiment is a coin cell battery such as those used in calculators and watches.

The microcontroller 905 of one embodiment is comprised of a central processing unit ("CPU") 910, a read only memory ("ROM") 970, and a scratchpad RAM 940. The ROM 970 is further comprised of an interpreter module 920 and a toolbox module 930.

The toolbox module 930 of the ROM 970 contains a set of toolbox routines for processing data, text and graphics on the device 100. These routines include drawing text and graphics on the device's display 430, decompressing data transmitted from the portal server 110, reproducing audio on the device 100, and performing various input/output and communication functions (e.g., transmitting/receiving data over the client link 10 and/or the RF link 220). A variety of additional device functions may be included within the toolbox 930 while still complying with the underlying principles of the invention.

In one embodiment, microprograms and data are transmitted to/from the external memory 950 of the device via a communication interface 970 under control of the CPU 910. Various communication interfaces 970 may be employed without departing from the underlying principles of the invention including, for example, a Universal Serial Bus ("USB") interface or a serial communication ("serial") interface. The microprograms in one embodiment are comprised of compact, interpreted instructions known as "bytecodes," which are converted into native code by the interpreter module 920 before being executed by the CPU 910. One of the benefits of this configuration is that when the microcontroller/CPU portion of the device 100 is upgraded (e.g., to a faster and/or less expensive model), only the interpreter module 920 and toolbox 930 of the ROM needs to be rewritten to interpret the currently existing bytecodes for the new microcontroller/CPU. In addition, this configuration allows devices with different CPUs to coexist and execute the same microprograms. Moreover, programming frequently-used routines in the ROM toolbox module 930 reduces the size of microprograms stored in the external memory 950, thereby conserving memory and bandwidth over the client link 10 and/or the RF link 220. In one embodiment, new interpreter modules 920 and/or toolbox routines 930 may be developed to execute the same microprograms on cellular phones, personal information managers ("PIMs"), or any other device with a CPU and memory.

One embodiment of the ROM 970 is comprised of interpreted code as well as native code written specifically for the microcontroller CPU 905. More particularly, some toolbox routines may be written as interpreted code (as indicated by the arrow between the toolbox 930 and the interpreter module 920) to conserve memory and bandwidth for the same reasons described above with respect to microprograms. Moreover, in one embodiment, data and microprograms stored in external memory 950 may be configured to override older versions of data/microprograms stored in the ROM 970 (e.g., in the ROM toolbox 930).

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments described above employ specific techniques for cursor control (e.g., moving a highlight bar with a scroll wheel), the underlying principles of the invention are not limited to any particular cursor control mechanism. Accordingly, the scope and spirit of the invention should be judged in terms of the claims which follow.

What is claimed is:

1. A data processing apparatus comprising:
a display for displaying text and/or graphics;
an alphanumeric keyboard having a first group of keys and a second group of keys, each of the first group of keys having assigned thereto a specific alphabetic character, and each of the second group of keys having assigned thereto both a specific alphabetic character and a specific number; and
user interface generation logic to monitor keys on the keyboard selected in sequence by the end user, and if all keys within the sequence are keys within the second group of keys, to then generate within the display a contact list containing contact entries, each of the contact entries within the list identified based on the alphabetic characters associated with the sequence of selected keys and/or the numbers associated with the sequence of selected keys.

2. The data processing apparatus as in claim 1 wherein the user interface generation logic further generates a visual display of both the alphabetic characters and the numeric characters associated with each of the keys selected in the sequence.

3. The data processing apparatus as in claim 2 wherein the alphabetic characters and numeric characters associated with each key are displayed adjacent to one another.

4. The data processing apparatus as in claim 1 further comprising:
an address book, wherein the user interface generation logic queries the address book using the alphabetic characters and/or numbers associated with the sequence of keys to identify the contact entries to include within the contact list.

5. The data processing apparatus as in claim 1 wherein the contact entries within the list have alphabetic characters and/or numbers highlighted corresponding to the alphabetic characters associated with the sequence of selected keys and/or the numbers associated with the sequence of selected keys.

6. The data processing apparatus as in claim 1 wherein, if one or more keys within the sequence are not keys within the second group of keys, then the user interface generation logic to generate within the display a contact list containing contact entries, each of the contact entries within the list identified based solely on the alphabetic characters associated with the sequence of selected keys.

7. The data processing apparatus as in claim 1 further comprising:
the user interface generation logic causing the specific number associated with each key in the second group of keys to be selected rather than the specific alphanumeric character in response to detecting that no contact entries exist which correspond to the alphabetic characters and/or the numbers associated with the sequence of selected keys.

8. The data processing apparatus as in claim 7 wherein the user interface generation logic generates a visual display of the numeric characters but not the alphabetic characters or the contact list.

9. A method comprising:
assigning to each of a first group of keys of an alphanumeric keyboard a specific alphabetic character;
assigning to each of a second group of keys of the alphanumeric keyboard both a specific alphabetic character and a specific number; and
monitoring keys on the keyboard selected in sequence by an end user, and if all keys within the sequence are keys within the second group of keys, generating within the display a contact list containing contact entries, each of the contact entries within the list identified based on the alphabetic characters associated with the sequence of selected keys and/or the numbers associated with the sequence of selected keys.

10. The method as in claim 9 further comprising:
generating a visual display of both the alphabetic characters and the numeric characters associated with each of the keys selected in the sequence.

11. The method as in claim 10 further comprising:
displaying the alphabetic characters and numeric characters associated with each key adjacent to one another.

12. The method as in claim 9 further comprising:
performing a query to an address book using the alphabetic characters and/or numbers associated with the sequence of keys to identify the contact entries to include within the contact list.

13. The method as in claim 9 further comprising:
highlighting alphabetic characters and/or numbers within the contact list that correspond to the alphabetic characters associated with the sequence of selected keys and/or the numbers associated with the sequence of selected keys.

14. The method as in claim 9 wherein, if one or more keys within the sequence are not keys within the second group of keys, then generating a contact list containing contact entries, each of the contact entries within the list identified based solely on the alphabetic characters associated with the sequence of selected keys.

15. The method as in claim 14 further comprising:
causing the specific number associated with each key in the second group of keys to be selected rather than the specific alphanumeric character in response to detecting that no contact entries exist which correspond to the alphabetic characters and/or the numbers associated with the sequence of selected keys.

16. The method as in claim 15 further comprising:
generating a visual display of the numeric characters but not the alphabetic characters or the contact list.

17. A method for dialing a telephone number on a telephony device comprising:
assigning to each of a first group of keys of an alphanumeric keyboard a specific alphabetic character;
assigning to each of a second group of keys of the alphanumeric keyboard both a specific alphabetic character and a specific number; and
monitoring keys on the keyboard selected in sequence by an end user, and if all keys within the sequence are keys within the second group of keys, generating a visual representation of both the alphabetic characters and the numeric characters associated with each of the keys selected in the sequence, whereas if one or more of the keys within the sequence are keys not within the second group of keys, generating a visual representation of only the alphabetic characters associated with each of the keys selected in sequence.

18. A method as in claim 17 further comprising:
generating a contact list containing contact entries if all of the keys within the sequence are keys within the second group of keys, each of the contact entries within the list identified based on the alphabetic characters associated with the sequence of selected keys and/or the numbers associated with the sequence of selected keys.

19. The method as in claim 17 further comprising:
displaying the alphabetic characters and numeric characters associated with each key adjacent to one another.

20. The method as in claim 18 further comprising:
performing a query to an address book using the alphabetic characters and/or numbers associated with the sequence of keys to identify the contact entries to include within the contact list.

21. The method as in claim 18 further comprising:
highlighting alphabetic characters and/or numbers within the contact list that correspond to the alphabetic characters associated with the sequence of selected keys and/or the numbers associated with the sequence of selected keys.

22. The method as in claim 17 wherein, if one or more keys within the sequence are not keys within the second group of keys, then generating a contact list containing contact entries, each of the contact entries within the list identified based solely on the alphabetic characters associated with the sequence of selected keys.

23. The method as in claim 22 further comprising:
causing the specific number associated with each key in the second group of keys to be selected rather than the specific alphanumeric character in response to detecting that no contact entries exist which correspond to the alphabetic characters and/or the numbers associated with the sequence of selected keys.

24. The method as in claim 23 further comprising:
generating a visual display of the numeric characters but not the alphabetic characters or the contact list.

* * * * *